R. SHEDENHELM.
TRUCK FOR MANURE LOADERS.
APPLICATION FILED MAY 11, 1908.
949,202. Patented Feb. 15, 1910.
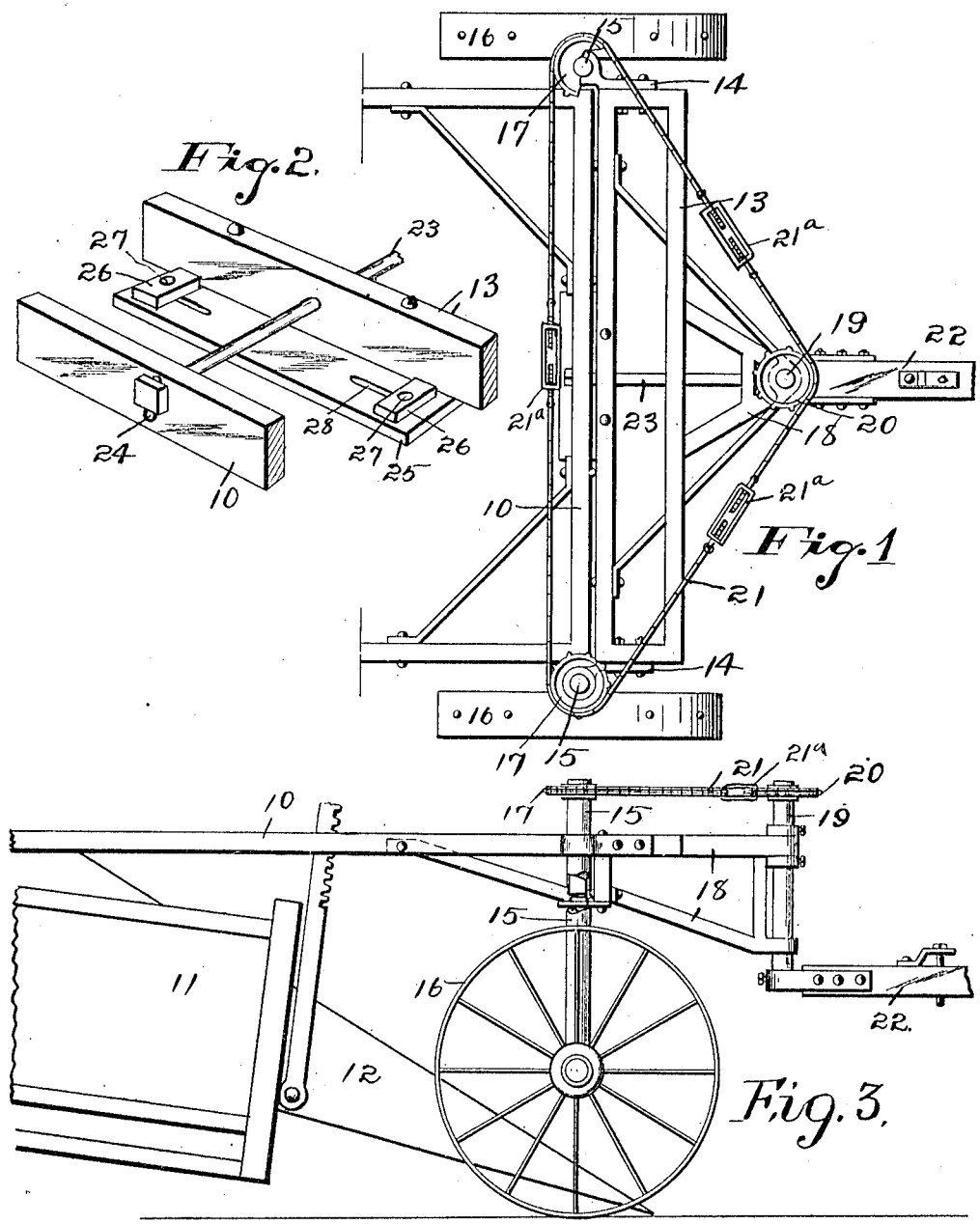

UNITED STATES PATENT OFFICE.

ROBERT SHEDENHELM, OF LADORA, IOWA, ASSIGNOR, BY MESNE ASSIGNMENTS, OF FOUR-TENTHS TO H. S. BUTLER.

TRUCK FOR MANURE-LOADERS.

949,202.      Specification of Letters Patent.      Patented Feb. 15, 1910.

Application filed May 11, 1908. Serial No. 432,100.

*To all whom it may concern:*

Be it known that I, ROBERT SHEDENHELM, a citizen of the United States, residing at Ladora, in the county of Iowa and State of Iowa, have invented a new and useful Truck for Manure-Loaders, of which the following is a specification.

The object of my invention is to provide a truck of simple, durable, and inexpensive construction, especially designed for use in connection with a vehicle adapted to carry a scraper for the purpose of loading manure upon the wagon bed of the vehicle.

More specifically it is my object to provide a truck of this kind that may be easily turned around in a small space and that will be strong and durable as required to firmly support the scraper on the wagon bed, and further to provide means whereby the scraper blade may be firmly held at a slight angle relative to the ground surface over which the front wheels are passing, to thereby avoid the tendency for one side or the other of the scraper blade to cut deeper than is desired.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a top or plan view of a truck embodying my invention with part of the supporting frame of a wagon bed connected therewith. Fig. 2 shows an enlarged detail perspective view of the adjacent portions of the forward truck frame and the frame for supporting the wagon bed, the latter being shown in position separated from the former, and Fig. 3 shows a side elevation of the device embodying my invention with part of a wagon bed adjacent to the supporting frame therefor and a scraper blade carried by the wagon bed.

Referring to the accompanying drawings, I have used the reference numeral 10 to indicate the frame for supporting a wagon bed; 11 indicates a wagon bed to be supported by said frame; and 12, a scraper blade attached to the wagon bed. The arrangement of the frame 10, the wagon bed 11, and the scraper blade 12, form no part of my present invention and this structure is more fully illustrated and described in my companion application for a manure loader, filed May 11, 1908, Serial Number 432,098.

The forward truck comprises a rigid rectangular frame 13 of the same width as the frame 10 and having at each end a journal bearing 14, in which an upright shaft 15 is mounted; on the lower end of each shaft is a supporting wheel 16. On the upper end of each shaft is a sprocket wheel 17. Secured to the forward central portion of the frame 13 is a bracket 18 in which is rotatably mounted a shaft 19. On the upper end of the shaft 19 is a sprocket wheel 20 which is connected with the sprocket wheels 17 by a chain 21.

For the purpose of keeping the wheels 16 in line with the tongue and with each other, I have provided the turn buckles 21ª in the chain 21. There are three of these turn buckles which are midway between the sprocket wheels 20 and 17 and the sprocket wheels 17 on which said chain is mounted. Fixed to the lower end of the shaft 19 is a vehicle tongue 22. By this arrangement it is obvious that as the tongue is turned to one side, both of the supporting wheels 16 will be turned in the same direction. The wheels 16 are such size that they may be easily turned around in the frame 13, so that the entire vehicle may be easily turned around in a small space.

I provide for pivotally connecting the frame 10 and the frame 13 as follows: The numeral 23 indicates a bolt connected at its forward end to the bracket 18 and extended through the forward and rear portions of the frame 13, and also extended through a vertical slot 24 in the front piece of the frame 10, so that the frame 10 may have a limited vertical movement relative to the frame 13. Fixed to the under surface of the rear part of the frame 13 is a supporting plate 25, having two blocks 26 mounted thereon and capable of adjustment toward and from the center by means of the bolts 27 in the slots 28. The part 10 normally rests on top of these adjustable blocks 26 and said blocks tend to prevent tilting movements of the frame 10 relative to the frame 13; it is, however, not my purpose to prevent all such tilting movements as in some instances when one or the other of the supporting wheels 16 is lifted a considerable distance above the other, it is necessary that the forward frame be permitted to tilt relative to the rear one and the arrangement just described will permit this tilting movement, although, under ordinary circumstances the frame 10 will rest upon the blocks 26 and will be held thereby against tilting movement. Assuming that the scraper blade is being advanced over the ground surface and the material resting thereon is softer at one edge of the scraper blade than at the other, then there would be a tendency for one edge of the scraper blade to move downward into the ground. The supporting block 26 on the side adjacent to said edge of the scraper blade will tend to prevent such tilting movement up to a certain point, and then, if the tendency to tilt the scraper blade becomes too great, the frame 10 will tilt with its center of movement on the block 26 and not on the bolt 23. By adjusting the blocks 26 toward and from the bolt 23, the frame 10 may be made to tilt when either greater or less pressure is applied to one side of the scraper blade.

I claim as my invention.

1. In a device of the class described, the combination of a frame for supporting a wagon bed, a forward truck frame pivotally connected therewith, upright shafts mounted at the ends of the truck frame, supporting wheels thereon, sprocket wheels on top of said shafts, an upright shaft at the front of the truck frame, a sprocket wheel thereon, a sprocket chain connecting said sprocket wheels and a tongue fixed to said forward shaft.

2. In a device of the class described, the combination of a frame for supporting a wagon bed, a forward truck frame pivotally connected therewith, upright shafts mounted at the ends of the truck frame, supporting wheels thereon, sprocket wheels on top of said shafts, an upright shaft at the front of the truck frame, a sprocket wheel thereon, a sprocket chain connecting said spocket wheels and a tongue fixed to said forward shaft, and turn buckles in said chain between the sprocket wheels.

3. In a device of the class described, the combination of a frame for supporting a wagon bed, a forward truck frame, supporting wheels on the forward truck frame, means for pivotally connecting said frames together and for permitting one of them to move vertically relative to the other, and a plate fixed to one of said frames and extended under the central portion of the other for the purpose stated.

4. In a device of the class described, the combination of a frame for supporting a wagon bed, a forward truck frame, supporting wheels on the forward truck frame, means for pivotally connecting said frames together and for permitting one of them to move vertically relative to the other, and a plate fixed to one of said frames and extended under the central portion of the other, and two blocks adjustably mounted on said plate to engage the central portion of the frame for supporting the wagon bed.

5. In a device of the class described, the combination of a frame for supporting a wagon bed, a forward truck frame, brackets at the sides of the forward truck frame, vertical shafts mounted in said brackets, supporting wheels mounted at the lower ends of said brackets, sprocket wheels fixed to the upper ends of said shafts, a vertical shaft supported in front of said truck frame, a sprocket wheel on its upper end, a sprocket chain connecting said wheels, a vehicle tongue fixed to the lower end of the forward upright shaft, a plate fixed to the central portion of the truck frame and extended rearwardly, two blocks adjustably mounted upon said plate, near its ends, a bolt fixed to the truck frame rearwardly, said frame for supporting the wagon bed being provided with a vertical slot having said bolt pass through it substantially as and for the purposes stated.

6. In a device of the class described, the combination of a truck frame, a second frame pivoted to the forward end of the truck frame so that its ends may tilt vertically, a supporting wheel at each end of said forward frame capable of independent movement for steering purposes, and means for simultaneously operating said supporting wheels to turn in the same direction for steering purposes.

Des Moines, Iowa, April 1, 1908.

ROBERT SHEDENHELM.

Witnesses:
RALPH ORWIG,
A. G. HAGUR.